United States Patent
Lotter

(10) Patent No.: US 7,627,851 B2
(45) Date of Patent: Dec. 1, 2009

(54) MODIFICATION METHOD FOR MODIFYING A SOURCE CODE

(75) Inventor: Johann Christian Lotter, Ronneburg (DE)

(73) Assignee: Conitec GmbH, Dieburg (DE)

( * ) Notice: Subject to any disclaimer, the term of this patent is extended or adjusted under 35 U.S.C. 154(b) by 692 days.

(21) Appl. No.: 10/893,579

(22) Filed: Jul. 15, 2004

(65) Prior Publication Data

US 2006/0015856 A1  Jan. 19, 2006

(51) Int. Cl.
*G06F 9/44* (2006.01)
(52) U.S. Cl. ............... 717/106; 717/111; 717/113; 717/143
(58) Field of Classification Search .......... 717/100, 717/110, 111, 130, 158, 135, 147
See application file for complete search history.

(56) References Cited

U.S. PATENT DOCUMENTS

| | | | | |
|---|---|---|---|---|
| 6,009,441 A * | 12/1999 | Mathieu et al. | ............. | 715/236 |
| 6,257,774 B1 * | 7/2001 | Stack | ........................ | 717/110 |
| 6,305,008 B1 * | 10/2001 | Vaidyanathan et al. | ...... | 717/111 |
| 6,654,953 B1 * | 11/2003 | Beaumont et al. | ........... | 717/158 |
| 6,857,119 B1 * | 2/2005 | Desai | ........................ | 717/145 |
| 6,996,771 B1 * | 2/2006 | O'Brien | ...................... | 715/207 |
| 7,043,692 B2 * | 5/2006 | Yu | ............................. | 715/762 |
| 2004/0015843 A1 * | 1/2004 | Quan, Jr. | .................... | 717/110 |
| 2004/0078785 A1 * | 4/2004 | Dutt et al. | .................... | 717/136 |
| 2004/0117771 A1 * | 6/2004 | Venkatapathy | ............. | 717/130 |
| 2004/0230964 A1 * | 11/2004 | Waugh et al. | ............... | 717/168 |
| 2005/0183058 A1 * | 8/2005 | Meijer et al. | ................ | 717/100 |
| 2005/0229154 A1 * | 10/2005 | Hiew et al. | ................... | 717/110 |
| 2005/0235258 A1 * | 10/2005 | Wason | ........................ | 717/110 |

* cited by examiner

*Primary Examiner*—Lewis A Bullock, Jr.
*Assistant Examiner*—Jue S Wang
(74) *Attorney, Agent, or Firm*—Collard & Roe, P.C.

(57) ABSTRACT

The invention relates to a method for modifying a source code, wherein potential modification locations of the source code to be modified are pre-defined by means of comment markers already placed in the source code to be modified, and clearly referenced, whereby the source code to be modified is first read out by means of a parser, and the comment markers contained in the source code are recognized, whereby an input panel is generated for every comment marker, on the basis of the data contained in the comment markers, in each instance, whereby the required data for individual adaptation of the software are queried from the user, checked and, if necessary, corrected, by way of this input panel, and the modifications are entered into the source code to be modified, on the basis of these defaults as well as the sets of rules contained in the comment markers.

13 Claims, 3 Drawing Sheets

Figure 1:
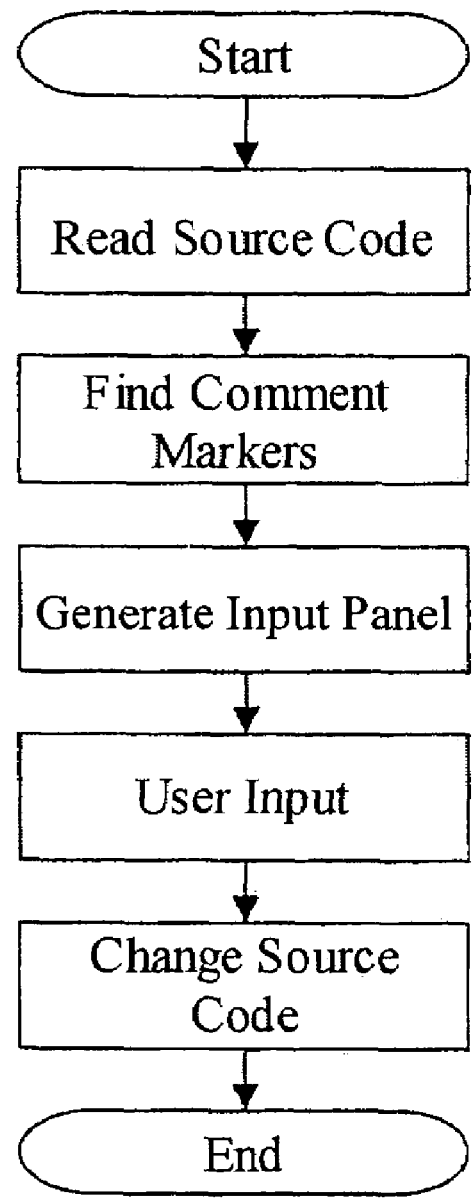

```
// title: Cut Scene (00)
// section: Cutscene #1

// entry: Name of the cutscene media file
char cutscene00_file1_str[] = "file1.wav";
// entry: Trigger value used to play this file
// entry_help: < 1 means the file will not be played
#define cutscene00_trigger1  0
// entry: Volume
#define cutscene00_volume1  75
// entry: Time between re-play of the media file (-1, dont replay. 0-play always)
int cutscene00_reset_time1 = -1;
....
```

Fig. 2

C:\PROJECT\ACKNEX\ackwed\work\cutscene00.wdl

Cut Scene (00)

Cutscene #1

Name of the cutscene media file
file1.wav

Trigger value used to play this file
0

Volume
75

Time between re-play of the media file (-1, dont replay. 0-play always)
-1

Cutscene #2

Name of the cutscene media file
file1.wav

Trigger value used to play this file
0

Volume
75

Time between re-play of the media file (-1, dont replay. 0-play always)
-1

[Ok] [Cancel]

FIG. 3

MODIFICATION METHOD FOR MODIFYING A SOURCE CODE

Within the framework of software development, there has always been the problem that in connection with software structures that become ever more complex, the subsequent modifications that occur in connection with almost all software, and are almost unavoidable, can essentially be performed only by the developer or developer team of the software in question, in each instance, because meaningful intervention in the branched and complex structure can only be made by its programmers, because of the complex program structures, despite the commenting and commenting possibilities that have been significantly improved in the meantime. In this connection, information technology has created constantly improved script languages and programming tools in recent years, which allow extensively automatic generation of program codes.

However, the possibilities of modifying a source code once it has been created have not kept pace with this development.

At the same time, the need for subsequent adaptation of software has increased dramatically in recent years. For one thing, reference should be made here to the increasing distribution of open source programs, whose specific intent and purpose is to exclude possible error sources and to be able to perform updates as well as adaptations to individual needs, in simple manner, in that the source code of the program in question is laid open and therefore allows every user to have unhindered access and therefore also to make desirable changes in this connection. This theoretically useful possibility is usually restricted to a few expert programmers and developers, because the convenient tools that are available for generating source codes are not available for modifying the source code.

Proceeding from this state of the art, the invention is based on the task of creating a modification method for source codes, independent of a concrete program language, which offers the greatest possible convenience to the user and therefore can be used almost without any technical knowledge and, in particular, without any knowledge of the concrete software structure, in each instance.

Accomplishing this task succeeds by means of a modification method as recited in the main claim. Advantageous embodiments of the invention can be derived from claims 2 to 14.

The fundamental idea of the method according to the invention consists in preparing the source code, in each instance, for possible modifications as early as the time of generation, in that special comment markers are placed into this source code. The comment markers can be placed at any desired location. They are clearly assigned to potential modification locations of the software to be modified. These comment markers can then be generated for implementing the change, by means of a special parser that reads out the source code to be modified. By means of the rules established in the comment markers, an input panel is then first generated, by way of which the user, in each instance, is prompted to enter the data required for the individual adaptations or modifications of the source code that he/she wishes to make. As a function of the data entered by the user by way of the input panel, and the set of rules additionally established in the comment marker, in each instance, the parser then generates a modified source code that is then written in place of the source code to be modified, or the source code segment to be modified.

A parser is a conventional language analyzer such as that used, for example, in connection with conventional compilers. Step-by-step analysis of a language, here of a source code, is referred to as parsing.

By means of the above method, existing program libraries can be adapted to new applications. As an ancillary measure, so-called "graphic engines" that are delivered together with a corresponding source code can be newly compiled by the end user and thereby adapted to the personal needs of the end user. In the same manner, of course, scripts or macros can also be adapted. The function of many programs is controlled by so-called "script languages" or "macro languages" such as Python, Basic, C-Script, or other product-specific languages. The purpose of this script control is to allow the individual user to individually adapt his/her programs, or to expand the existing programs by new, special functionalities, by way of special programming. Within the scope of the above modification method, the aforementioned adaptations can be made even without knowing the script languages mentioned, at least to a certain degree.

As already mentioned, the method according to the invention can also be utilized to adapt open source code programs to the specific applications, again at least to a limited degree.

According to claim 2, the software that has been modified by means of the modification method according to the invention can be re-compiled, if necessary.

In an advantageous embodiment, the input panel is provided with a help function and/or help file for explaining the data being requested from the user. It is understood that the clarity of the query from the input panel is the deciding factor that determines the degree to which the users, in each instance, are able to modify existing program structures. Vice versa, the vendor of the software planned for modification can set the quality of the comment markers and their concrete configuration, as well as the possibilities of individual modification of his/her program and its ease of operation, more or less as he/she desires.

In an advantageous embodiment of this functionality, at least part of the input fields of the input panel has an explanation and/or questions for querying the data to be obtained from the user, in each instance.

The comment markers to be placed into the source code to be modified comprise at least one key word and/or key character, for a clear definition of the comment marker, in each instance.

In most script languages, it will be necessary to introduce the comment markers by means of so-called special comment characters, and these can differ from one script language to another. These special comment characters allow an automatic search for the comment markers by means of the parser that is being used to carry out the modification function.

In another advantageous embodiment, the comment markers can be provided with additional information, in addition to the special comment characters and key words or key characters. These are, for example, definitions of the type of data being requested from the user and/or of the input rules that must be observed or that apply in this connection, or structure instructions regarding the design of the input panel, in each instance, such as the title assigned to the input panel, in each instance, graphic elements, and/or positioning instructions for the arrangement of elements within this input panel.

As supplementary information, help texts for the input screen used within the scope of the input panel can be assigned to the input panel to be generated, within the scope of the comment marker. Furthermore, it can be necessary that the comment marker has clear references to the source code to be modified assigned to it. As an alternative, this assignment can, of course, also be established by means of the arrangement of the comment markers in the source code to be modified.

In a concrete embodiment, the modification method according to the invention is carried out automatically, to a great extent, after it has been called up, by means of a parser, whereby the steps named in claim 8 are essentially performed one after the other. In this connection, it should be particularly noted that as an extreme precaution, not only is the source code to be modified read into the parser, but an unchanged copy of the source code to be modified is also created in a special memory element also assigned to the parser. Furthermore, each input window of the source code has at least one temporary memory assigned to it, by way of which the user then enters the information requested via the input panel. When the input panel has been completed by the user, the user-related data or the source code automatically generated on the basis of these data are then written back to the locations of the source code to be modified, and thereby an automatic modification of the source code to be modified is performed, with a modified source code.

Usually, the input panel generated on the basis of a comment marker has several input windows that have a temporary memory assigned to them in each instance.

In an advantageous embodiment, each of these input windows can have an individual input rule assigned to it, which is automatically monitored by the parser, whereby then the data obtained from the user can either be automatically corrected by the parser, or the user can be prompted to correct them, until the input, in each instance, matches the input rules assigned to this input field.

In another advantageous embodiment, each input window can additionally have a help function assigned to it, whereby it is advantageous if the display of the help window for the display window, in each instance, can be called up on the basis of a window event, for example a mouse click.

In an improved embodiment, the parser is equipped with a break-off function. This is understood to mean that when the so-called "break-off" function is called up, the data that have been saved in the temporary memory assigned to the input windows can be called up and thereby the user inputs that might have taken place since the last memory function are overwritten with these values that are already saved. Call-up of this function therefore allows a defined recourse of the user to a data status that was created at the time of the last save.

In an advantageous further development, the parser can additionally be provided with a re-set function, in such a manner that the data are not called up from the temporary memories assigned to the input windows of the input panel, but rather the data are called up from the original source code, which was saved in a separate memory element assigned to the parser. Using the re-set function, the status before the modification function was called up is therefore restored, at least essentially.

In a particularly advantageous embodiment, the parser additionally has a so-called update function. Using the update function, the circumstance can be taken into account that in some cases, the source code referenced with the comment markers might change. This is possible with the delivery of updates, for example. This case would be particularly annoying if the user has already made an extensive adaptation of the software to his/her individual requirements, and this adaptation would now be lost, with the purchase of the software update. In an advantageous embodiment, the values saved in the temporary memories assigned to the input windows can be used for this purpose. With the call-up of the update function, the updated software is set in the place of the software to be modified up to that time, and then the parameters or values saved in the temporary memories are written to the appropriate locations of the updated source code, and thereby the adaptations already made by the user are transferred to the updated software.

The invention will be explained in greater detail below, using an exemplary embodiment that is shown only schematically in the drawing.

The drawing shows:

FIG. 1: a flow chart of the parser used within the scope of the modification method, FIG. 2: a modified source code with comment markers, and FIG. 3: an input panel generated by the parser on the basis of the comment markers shown in FIG. 2.

In accordance with the greatly simplified representation of a possible exemplary embodiment, a parser is used, within the scope of the method according to the invention, which, after it has been called up, allows automatic modification of a source code, to a great extent. In the exemplary embodiment described below, the parser is configured as a program structure of a computer unit, such as a personal computer, a workstation, or a terminal of a computer network. Of course, the method according to the invention can be configured in connection with almost any computer or processor units, in other words also as an integral component of a microprocessor structure having a regulation and control system. Specifically in this sector, such automatic modifications, for example in connection with updates or adaptation to special tasks of an integrated circuit, can be helpful and necessary.

The extensive restriction of the following exemplary embodiment to a computer unit that is approximately comparable to a personal computer is therefore not allowed to be understood as a corresponding restriction of the invention.

After the start of the modification method according to the invention, and therefore the start of the parser that is contained in the computer unit for implementing this modification method, this parser essentially performs the following steps:

The parser opens the source code file to be modified, which is contained in a memory, for example a hard disk memory of the computer unit, and reads out the source code of this file. Parallel to this, an original copy of the source code to be modified, but as yet unchanged, is saved in a memory element especially assigned to the parser.

In a further step, the parser then recognizes the comment characters already placed in the source code, in the source code to be modified, on the basis of the special comment characters that are typical for the program language being used, in each instance. Subsequently, the comment markers that are recognized are evaluated with regard to the specific key words or key characters contained in these comment markers, and their type is recognized. In a further embodiment, it is then recognized, either on the basis of the assignment of the comment marker in the source code in question, or on the basis of concrete addresses or other data in the comment marker in question, to what part of the source code to be modified the comment marker in question relates. In a further evaluation step, the type of the source code segment to be modified is also recognized, in this connection, in other words whether a file name, a text script, or the like has to be changed, for example.

Furthermore, additional information, such as input rules that must be observed in the range of variables, or the modifications that are permissible in connection with the file name, are recognized from the comment marker. In another step, the help texts that might be contained in the comment markers are also read out. Finally, the command for configuring the input panel to be generated, such as its title, images or subdivisions to be arranged in the region of the input panel, are derived from the comment marker to be evaluated, in each instance.

Finally, the parser generates an input panel having an input window, in each instance, for each source code segment to be modified; in doing so, it observes all of the aforementioned data. In this connection, a separate temporary memory is assigned to each input window. The current content of the temporary memory is displayed in the input window, in each instance.

In another step, the current values assigned to the temporary memory, in each instance, are now read out of the source code referenced, and shown in the display panel, in the input window in question. Furthermore, additionally or as needed, or when called up in the input window, an appropriate help text or other input aid is displayed.

Using the help text or other query text individually assigned to the input windows, the user is now prompted to input the data required for making the desired modifications, using the input panel. As soon as the user then activates the memory function assigned to the parser, the data written by the user into the input windows and thereby into the temporary memory are placed into the appropriate locations of the source code to be modified. The old values in the source code to be modified are thereby overwritten. In this connection, it must be noted that input rules can also be assigned to the input windows, in each instance, in such a manner that the data are not taken over identically, but rather these new source code segments can be generated by means of these inputs, using sets of rules assigned to the temporary memories, i.e. input windows, in each instance, if necessary. In a final step, the modification generated by taking over the using the input panel, and the modified for entering these modified data is then written back to the source code to be modified, in the data memory of the computer unit, and thereby the source code segment modified for every comment marker for every comment marker is saved on the data medium in question.

The flow chart shown in FIG. 1 with regard to the sequence of the parser is necessarily greatly simplified, so that it must additionally be pointed out that the parser normally has a so-called break-off function assigned to it. Activation of the break-off function ensures that the data entered into the input window by the user are re-set and that instead, the input values that have already been saved in the temporary memory are again displayed in the input window. By activating the break-off function, only those user data that have been input since activation of the memory function are lost.

In severe cases, the re-set function assigned to the parser can also be used. This is understood to mean that now, it is not the data already saved in the temporary memory that are accessed, but rather instead, the original copy of the software, already mentioned above, is accessed. Then, the values from the original source code file are taken over into the temporary memory, so that essentially, the original status is restored.

Another advantageous function not shown in FIG. 1 is the so-called update function, which makes it possible for the data last entered into the temporary memory by the user to be used for the purpose of being entered into a software update purchased by the user, for example, without having to input them again. When this function is activated, a new reference to the software update is produced by means of the references established in the original comment markers, and then the values saved in the temporary memories are written over this new source code that might still have to be modified, and therefore the modifications that were already made in the previous software version are simply taken over into a new software update, with only a few steps.

FIG. 2 shows an example for a comment marker that might be integrated into a source code.

According to the representation in FIG. 1, each comment marker is introduced with the special comment character //. This comment is followed by a key word and other optional parameters, and represents the usual structure for a comment marker, using a script language based on the C programming language. The first comment marker, introduced with the comment character already mentioned, is followed by the key word "title," so that it becomes clear that the window title of the input panel to be generated is designated with this comment marker. The parameter "text" appears as the window title of the input panel to be generated by the parser. If necessary, an image can also be displayed in the header of the input panel, using the key word "image" and an image file that is subsequently indicated.

A comment marker designated with the key word "help" can be used in order to assign a specific text to a help button displayed on the input panel to be generated.

In the concrete exemplary embodiment, the key word "section" is used as the next comment marker, which leads to the result that a horizontal line is generated in the input panel. This can be used to divide separate input windows into groups. Using the next comment marker, "cut scene," an input field is then generated. The field carries the indicated text as the designation, in this case "name of the cutscene media file." Using the text, the next number following the comment marker, or the next true or false constant, or the next text string, or the next file name, can then be processed. In the present case, it was possible to process a file designated as "cutscene00." Using so-called string restriction characters (""), a text input field having the designation "file1.wav" is then generated, and this value, i.e. this file, is displayed in the input field designated in this manner. The displays, in each instance, that correspond to the comment marker shown in FIG. 2, are shown in the input panel generated on the basis of this comment marker, according to FIG. 3.

The above therefore describes a modification method for a source code to be modified, wherein an input panel is automatically generated by means of special comment markers contained in the source code, which method allows even inexperienced users to modify the source code referenced in connection with the comment marker, on the basis of their individual requirements. In this connection, modification of the source code can be extensively facilitated by means of correspondingly powerful help and processing tools and, in particular, it can represent a valuable aid in the avoidance of possible programming errors within the scope of the modification.

The invention claimed is:

1. Modification method for modifying a source code saved in a computer unit, wherein potential modification locations of the source code to be modified are already pre-defined by means of comment markers in the source code to be modified, wherein in the course of the further method, the following steps are performed, one after the other:
    read-out of the source code to be modified, by means of a parser,
    automatic recognition of the comment markers contained in the source code to be modified, by means of the parser, said comment markers being assigned to potential modification locations of the source code to be modified,
    automatic generation of an input panel having input fields for input of the data required for modifying the source code, and their display on a display device for entering the data requested from a user by means of the input panel, automatic modification of the source code as a function of the data obtained from the user by means of the input panel, by means of a set of rules individually assigned to the comment marker, in each instance, and wherein the following steps of the modification method run automatically by means of the parser:

opening the source code to be modified, reading the source code to be modified into a segment of a working memory of the computer unit being used, currently assigned to the parser, in each instance, saving a back-up copy of the source code to be modified in a segment of the hard drive or another memory of the computer unit, assigned to the parser, in each instance, automatically finding the comment markers placed in the source code to be modified, by means of the special comment characters that introduce these comment markers, in each instance, automatically recognizing the type of the comment marker by means of key words or key characters contained in the comment markers, in each instance, assigning the comment marker, in each instance, to the sections of the source code to be modified, by the references to the source code to be modified contained in the comment marker, in each instance, evaluating the input rules contained in the comment marker, in each instance, particularly with regard to the value range of variables and/or the permissible extensions of file names, automatically generating an input panel with at least one input window, reading the values from the source code to be modified, in each instance, into a temporary memory of the computer unit, taking the data obtained from the user by means of the input panel over into this temporary memory, overwriting the locations to be modified in the source code by means of the current content of the temporary memory, and returning the modified source code to the data carrier of the computer unit.

2. Modification method for modifying a source code as recited in claim 1, wherein the modified source code is re-compiled.

3. Modification method for modifying a source code as recited in claim 1, wherein a help function and/or files containing explanations are assigned to the input panel.

4. Modification method for modifying a source code as recited in claim 3, wherein at least part of the input fields of the input panel have data containing explanations and/or questions with regard to the concrete query of the data to be entered by the user assigned to them.

5. Modification method for modifying a source code as recited in claim 1, wherein the comment markers comprise at least one key word or key character.

6. Modification method for modifying a source code as recited in claim 5, wherein the comment markers are introduced by means of a special comment character of the script language of the source code to be modified, in each instance.

7. Modification method for modifying a source code as recited in claim 5, wherein the comment markers are provided with additional information, in addition to the special comment characters and key words or key characters, preferably regarding the type of data being requested from the user and/or input rules for these data and/or structure instructions for generation of the input panel, in each instance, such as images, graphic elements, and/or positioning instructions for the arrangement of the graphic or other elements to be arranged within the framework of the input panel, and/or help texts of the input panel and/or references, such as jump addresses, for a clear assignment of the comment markers, in each instance, to the sections of the source code to be modified, in each instance.

8. Modification method for modifying a source code as recited in claim 1, wherein each input window has a temporary memory of the computer unit clearly assigned to it, in each instance, whereby the current content of the temporary memory can be represented by means of the input windows of the input panel, in each instance.

9. Modification method for modifying a source code as recited in claim 1, wherein the data obtained from the user by way of the input windows of the input panel, by means of the input rules assigned to the comment markers, are automatically checked by means of the parser, and the entries are either corrected automatically or the user is prompted to correct them.

10. Modification method for modifying a source code as recited in claim 8, wherein a file containing a help text is assigned to at least some input windows, and that these files can be called up preferably on the basis of a window event, such as a mouse click.

11. Modification method for modifying a source code as recited in claim 1, wherein the parser has a break-off function assigned to it, in such a manner that when this break-off function is called up, the input values last saved in the temporary memory assigned to the input windows of the input panel are read in from the source code to be modified.

12. Modification method for modifying a source code as recited in claim 1, wherein the parser has a re-set function assigned to it, in such a manner that when this re-set function is called-up, the original values of the source code still to be modified are written from the working memory into the temporary memory of the input windows, and therefore all the data obtained from the user are replaced with the original values of the source code, which has not yet been modified.

13. Modification method for modifying a source code as recited in claim 1, wherein the parser has an update function assigned to it, in such a manner that when the update function is called up, the source code sections assigned to the input panel, in each instance, are replaced with new source code sections, whereby the data saved in the temporary memory assigned to the input windows of the input panel are maintained, and can be written into this source code file by means of an additional memory function assigned to this update function.

* * * * *

UNITED STATES PATENT AND TRADEMARK OFFICE
CERTIFICATE OF CORRECTION

| | | |
|---|---|---|
| PATENT NO. | : 7,627,851 B2 | Page 1 of 1 |
| APPLICATION NO. | : 10/893579 | |
| DATED | : December 1, 2009 | |
| INVENTOR(S) | : Johann Christian Lotter | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 904 days.

Signed and Sealed this

Second Day of November, 2010

David J. Kappos
*Director of the United States Patent and Trademark Office*